(12) United States Patent
Akiyama et al.

(10) Patent No.: US 11,198,607 B2
(45) Date of Patent: Dec. 14, 2021

(54) LIGHT ABSORBING MEMBER, MEMBER FOR HYDROGEN PRODUCTION, AND HYDROGEN PRODUCTION APPARATUS

(71) Applicant: KYOCERA Corporation, Kyoto (JP)

(72) Inventors: Masahide Akiyama, Kirishima (JP); Takeshi Ohkuma, Kirishima (JP); Kohei Ono, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 235 days.

(21) Appl. No.: 16/079,566

(22) PCT Filed: Feb. 16, 2017

(86) PCT No.: PCT/JP2017/005626
§ 371 (c)(1),
(2) Date: Aug. 24, 2018

(87) PCT Pub. No.: WO2017/145903
PCT Pub. Date: Aug. 31, 2017

(65) Prior Publication Data
US 2019/0202691 A1    Jul. 4, 2019

(30) Foreign Application Priority Data

Feb. 25, 2016  (JP) .............................. JP2016-034517
May 20, 2016  (JP) .............................. JP2016-101595

(51) Int. Cl.
*C01B 3/06*  (2006.01)
*C04B 35/01*  (2006.01)
*C04B 35/634*  (2006.01)
*C04B 35/64*  (2006.01)
(Continued)

(52) U.S. Cl.
CPC .............. *C01B 3/063* (2013.01); *B01J 10/00* (2013.01); *C01B 3/061* (2013.01); *C04B 35/016* (2013.01); *C04B 35/63416* (2013.01); *C04B 35/64* (2013.01); *C04B 37/001* (2013.01); *C04B 2235/3268* (2013.01); *C04B 2235/365* (2013.01); *C04B 2235/768* (2013.01); *C04B 2235/781* (2013.01); *C04B 2235/785* (2013.01); *C04B 2235/9607* (2013.01);
(Continued)

(58) Field of Classification Search
CPC .... C04B 2235/3229; C04B 2235/3268; C04B 2235/768; C04B 35/016
See application file for complete search history.

(56) References Cited

U.S. PATENT DOCUMENTS 4,555,358 A * 11/1985 Matsushita ........... C04B 35/575
252/516
5,168,080 A   12/1992 Suzuki
(Continued)

FOREIGN PATENT DOCUMENTS

CN   101953230 A   1/2011
CN   108367917 A   8/2018
(Continued)

*Primary Examiner* — Imran Akram
(74) *Attorney, Agent, or Firm* — Viering, Jentschura & Partner Mbb

(57) ABSTRACT

A light absorbing member includes a ceramic composite having a plurality of first ceramic particles exhibiting positive resistance temperature characteristics in a first ceramics having an open porosity of 5% or lower.

18 Claims, 8 Drawing Sheets

(51) Int. Cl.
B01J 10/00 (2006.01)
C04B 37/00 (2006.01)

(52) U.S. Cl.
CPC .. *C04B 2235/9646* (2013.01); *C04B 2237/34* (2013.01); *Y02E 60/36* (2013.01)

(56) References Cited

U.S. PATENT DOCUMENTS

| | | | | |
|---|---|---|---|---|
| 5,334,563 | A * | 8/1994 | Garvie | C04B 35/106 264/681 |
| 2004/0005483 | A1* | 1/2004 | Lin | B82Y 25/00 428/702 |
| 2006/0283701 | A1* | 12/2006 | Li | B01J 35/004 204/157.52 |
| 2009/0212697 | A1* | 8/2009 | Nakamura | C09K 11/7774 313/506 |
| 2011/0120853 | A1* | 5/2011 | Chun | C10G 9/16 201/18 |
| 2012/0129689 | A1 | 5/2012 | Yoshii et al. | |
| 2013/0336879 | A1 | 12/2013 | Yamazaki | |
| 2014/0336295 | A1* | 11/2014 | Chi | B01D 39/2079 521/149 |
| 2015/0023828 | A1* | 1/2015 | Binder | C04B 38/0605 419/2 |
| 2015/0125383 | A1 | 5/2015 | Yamazaki et al. | |
| 2018/0370794 | A1 | 12/2018 | Akiyama et al. | |
| 2019/0202691 | A1 | 7/2019 | Akiyama et al. | |

FOREIGN PATENT DOCUMENTS

| | | |
|---|---|---|
| EP | 3392195 A1 | 10/2018 |
| EP | 3421443 A1 | 1/2019 |
| JP | H0724329 A | 1/1995 |
| JP | 2001038222 A | 2/2001 |
| JP | 2001219073 A | 8/2001 |
| JP | 2009263165 A | 11/2009 |
| JP | 2012110800 A | 6/2012 |
| WO | 2009105581 A1 | 8/2009 |
| WO | 2017145903 A1 | 8/2017 |

* cited by examiner

LIGHT ABSORBING MEMBER, MEMBER FOR HYDROGEN PRODUCTION, AND HYDROGEN PRODUCTION APPARATUS

CROSS-REFERENCE TO RELATED APPLICATIONS

This application is a national stage entry according to 35 U.S.C. 371 of PCT Application No. PCT/JP2017/005626 filed on Feb. 16, 2017, which claims priority to Japanese Application No. 2016-034517 filed on Feb. 25, 2016, and Japanese Application No. 2016-101595 filed on May 20, 2016, which are entirely incorporated herein by reference.

TECHNICAL FIELD

This disclosure relates to a light absorbing member, a member for hydrogen production, and a hydrogen production apparatus.

BACKGROUND

In recent years, as a solution to problems such as global warming due to an increase in carbon dioxide associated with the consumption of fossil fuels, clean renewable energy that does not emit carbon dioxide has been more important instead of the fossil fuels.

Solar energy, which is one of the renewable energy, has no worry of exhaustion and can contribute to the reduction in greenhouse gases. In recent years, fuel cells have been started to become common and expected as a growth engine for hydrogen energy society. So far, a large portion of currently produced hydrogen uses the fossil fuels as raw materials. Therefore, a problem of fundamental reduction in the fossil fuels remains unsolved.

Under such circumstances, an energy system in which primary energy is sought from solar light and secondary energy is supported by hydrogen is one of the ideal clean energy systems. Establishment of such an energy system is an urgent matter.

As one method of converting solar energy into chemical energy, for example, the use of a two-step hydrolysis reaction occurring when a ceramic member such as ceria ($CeO_2$) is used as a reaction system carrier has been developed (for example, refer to Patent Literature 1).

The two-step hydrolysis reaction is a reaction in which, in a first step, the ceramic member as the reaction system carrier is heated to 1400° C. to 1800° C. using solar energy to generate oxygen by the reduction of the ceramic member and, subsequently, in a second step, the reduced ceramic member is reacted with water at 300° C. to 1200° C. to generate hydrogen by oxidizing the reduced ceramic member.

Patent Literature 1: Japanese Laid-open Patent Publication No. 2009-263165

SUMMARY

A light absorbing member of a non-limiting embodiment of the present disclosure is constituted of a ceramic composite having a plurality of first ceramic particles exhibiting positive resistance temperature characteristics in a first ceramic having an open porosity of 5% or lower.

A member for hydrogen production of a non-limiting embodiment of the present disclosure is constituted of a hydrogen generating part constituted of a porous ceramic composite including second ceramic particles in a porous second ceramic, and a light absorbing part. The light absorbing part is constituted of the light absorbing member above.

A hydrogen production apparatus of the present disclosure includes a reaction module configured to cause oxidation-reduction reactions by receiving solar energy, a steam supply module configured to supply steam to the reaction module, and a recovery module configured to recover hydrogen gas generated from the reaction module. The member for hydrogen production above is located in the reaction module.

BRIEF DESCRIPTION OF DRAWINGS

FIG. 9A illustrates a state where oxygen is generated from the member for hydrogen production and FIG. 9B illustrates a state where hydrogen is generated from the member for hydrogen production.

FIG. 10A illustrates the case of FIGS. 4A and 4B where the section of the member for hydrogen production is circular and the member forms a tubular form. FIG. 10B illustrates the case of FIG. 5 where the section of the member for hydrogen production is rectangular and the member forms a tubular form. FIG. 10C illustrates the case of FIGS. 6A and 6B where the section of the member for hydrogen production is circular and the member forms a columnar form. FIG. 10D illustrates the case of FIGS. 7A and 7B where the section of the member for hydrogen production is rectangular and the member forms a columnar form.

DETAILED DESCRIPTION

As a method of converting solar energy into chemical energy, the use of ceramic members such as ceria ($CeO_2$) as a reaction system carrier has been conventionally developed as described above.

At the present stage, however, there is no demonstration test example in which heat from solar energy is used to directly heat the reaction system alone made of a ceramic member. As a matter of fact, the test is carried out using an infrared image furnace instead of sunlight.

Namely, decisive technology in order to transfer the heat from sunlight to the reaction system alone cannot be found in the current situation.

The present disclosure has been made in view of the above problems. The present disclosure may provide a light absorbing member, a member for hydrogen production, and a hydrogen production apparatus that can improve the hydrogen generation efficiency by efficiently absorbing the heat from sunlight.

Figure 1:
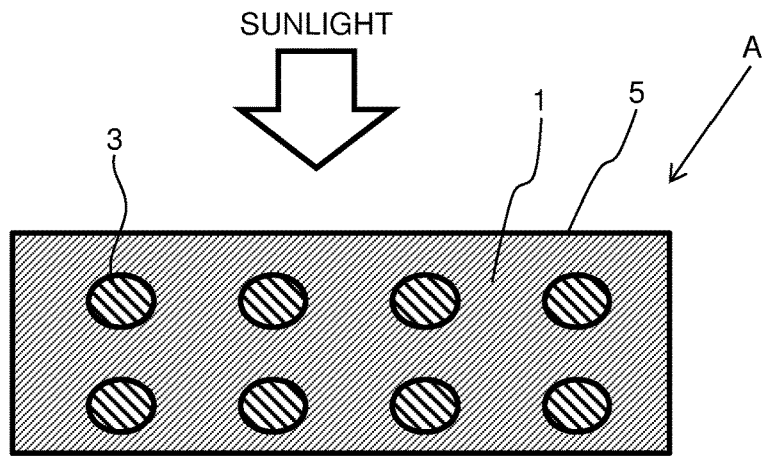
FIG. 1 is a sectional view schematically illustrating one embodiment of a light absorbing member of the present disclosure.

FIG. 1 is a sectional view schematically illustrating a non-limiting embodiment of a light absorbing member of the present disclosure. The light absorbing member A of the present embodiments is constituted of a ceramic composite 5 including ceramic particles 3 exhibiting positive resistance temperature characteristics (hereinafter, referred to as first ceramic particles 3) in a ceramic 1 being a parent phase (hereinafter, referred to as a first ceramic 1).

In this case, the components of the first ceramic 1 and first ceramic particles 3 are different. The first ceramic 1 has a dense property having an open porosity or 5% or lower and is a ceramic having a high insulating property.

On the other hand, the first ceramic particles 3 have conductive carriers (electrons). The carriers (electrons) are the basis for exhibiting the positive resistance temperature characteristics.

In the ceramic composite 5, the electrons existing in the first ceramic particles 3 develop a surface plasmon effect when the ceramic composite 5 absorbs sunlight. This allows the whole ceramic composite 5 to generate heat and thus the ceramic composite 5 results in a state of being heated to high temperature.

When the ceramic composite 5 generating heat by absorbing sunlight is combined with, for example, a member for hydrogen production described below, solar energy can be directly used for heating the member for hydrogen production.

The light absorbing member A of the present embodiments is constituted of the ceramic composite 5 made of ceramics alone. This results in extremely low deterioration of the material caused by oxidation as compared with the case where a material developing the surface plasmon effect is a metal. Therefore, the light absorbing member A having high durability can be obtained.

From the viewpoint of enhancing the surface plasmon effect, the first ceramic particles 3 may exist in the isolated state as a single particle in the first ceramic 1 in a non-limiting embodiment. In other words, the first ceramic particles 3 exist in a state where each of the particles may be dispersed in a non-limiting embodiment. The proportion of the particles existing in the isolated state is at a ratio in the particle number of 90% or higher in a non-limiting embodiment.

When the open porosity of the first ceramic 1 is higher than 5%, the first ceramic 1 is not dense and thus a coefficient of thermal conductivity decreases. Therefore, the member to be combined (member for hydrogen production) is difficult to heat in high temperature.

As the material for the first ceramic particles 3, a perovskite type composite oxide represented as $ABO_3$ is a suitable material. In this case, the first ceramic particles 3 include a rare earth element in an A site of $ABO_3$ and include a transition metal element in a B site. In addition, a slight amount of the first ceramic particles 3 may include an element having a different valence from the valences of the elements in the A site and the B site in a non-limiting embodiment. For example, a material in which the A site of $ABO_3$ is lanthanum (La), the B site is manganese (Mn), and a slight amount of Sr is included in this composition can be exemplified as a suitable example. As a composition formula, for example, a composite oxide represented by $La_{1-x}Sr_xMnO_{3+\delta}$ (x=0.01 to 0.9, $\delta$ is any value) may be used in a non-limiting embodiment.

The size (average particle diameter) of the first ceramic particles 3 may be fine in a non-limiting embodiment. The size may be 5 nm to 100 nm in a non-limiting embodiment, from the viewpoint of enhancing the surface plasmon effect.

The first ceramic 1 may have high light transparency in a non-limiting embodiment. For example, the luminance of the first ceramic 1 may be 5 or higher in a luminance indication classified by the Munsell color system according to a non-limiting embodiment.

The first ceramic 1 is suitably a glassy material containing silicon oxide as a main component and having a low thermal expansion property from the viewpoint of difficulty in crack generation and excellent heat resistance. In this case, the coefficient of thermal expansion of the ceramic composite 5 may be $9 \times 10^{-6}/°$ C. or less in a non-limiting embodiment.

From the viewpoint of enhancing the surface plasmon effect of the first ceramic particles 3, the proportion of the first ceramic particles 3 included in the ceramic composite 5 may be 10% to 80% in a volume ratio in a non-limiting embodiment.

The proportion of the first ceramic particles 3 existing inside the ceramic composite 5 is determined by using an electron microscope and an analyzer attached thereto (EPMA) by observing the section of the ceramic composite 5. For example, the ceramic composite 5 is polished to expose the first ceramic particles 3 and a predetermined region where 30 to 100 first ceramic particles 3 exist in the section is specified. Subsequently, the area of this region and the total area of the first ceramic particles 3 existing in this region are determined and the total area of the first ceramic particles 3 relative to the area of this region is determined. The area proportion thus determined is defined as the volume proportion. Whether the first ceramic particles 3 exist in the isolated state as a single particle in the first ceramic 1 is also determined by counting the number of the particles from the above observation.

Figure 2:
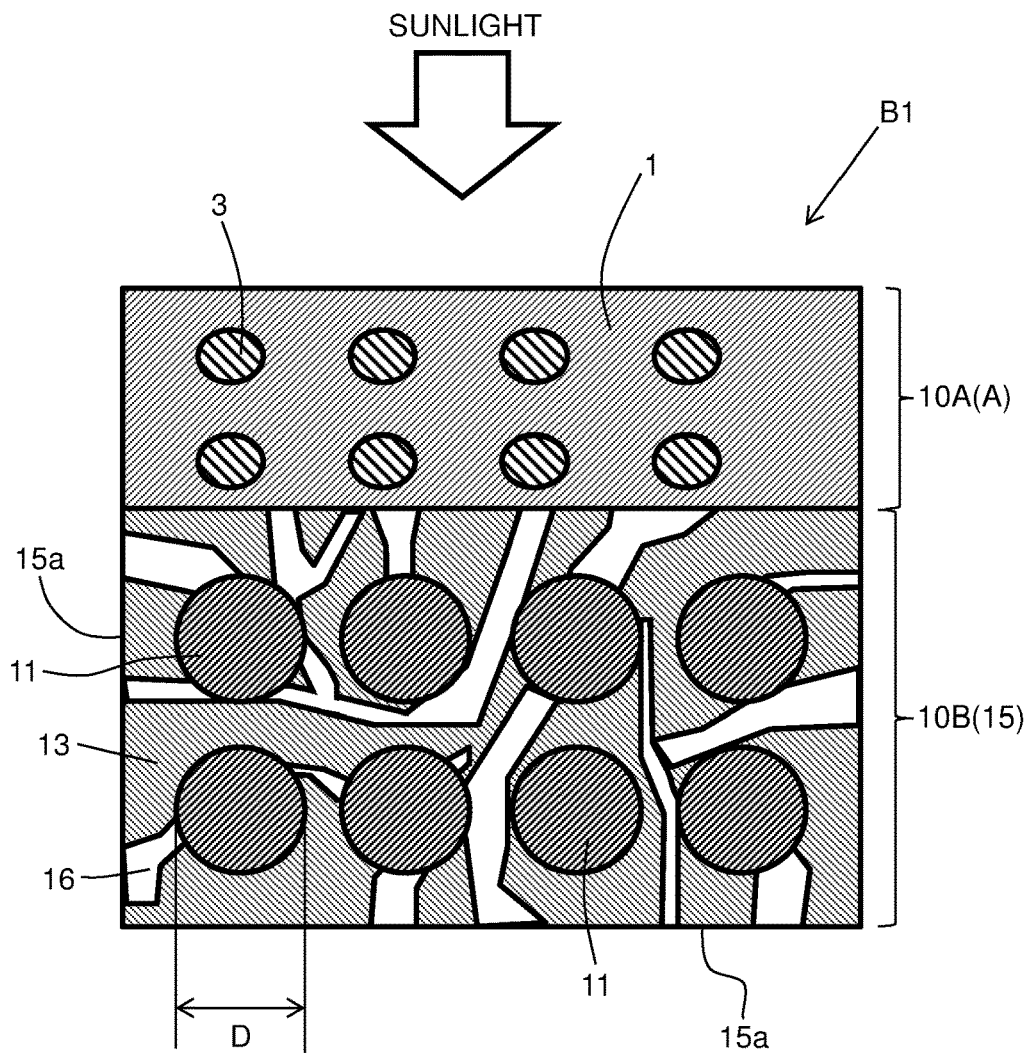
FIG. 2 is a sectional view schematically illustrating a First Embodiment of the member for hydrogen production in the present disclosure.

FIG. 2 is a sectional view schematically illustrating the First Embodiment of the member for hydrogen production of the present disclosure. The member for hydrogen production B1 of the First Embodiment has a light absorbing part 10A and a hydrogen generating part 10B. The light absorbing part 10A and the hydrogen generating part 10B are in contact with each other at least one main surface.

In the member for hydrogen production B1, the light absorbing part 10A is formed of the light absorbing member A. Therefore, even when the light absorbing part 10A becomes in a high temperature state, the light absorbing part 10A itself hardly deteriorates by oxidation. Consequently, the light absorbing part 10A having high durability can be formed.

The hydrogen generating part 10B is formed of a porous ceramic composite 15 formed by dispersing the fine ceramic particles 11 (hereinafter referred to as second ceramic particles 11) in a porous insulator (hereinafter referred to as a second ceramic 13). In this case, the main components of the second ceramic 13 and second ceramic particles 11 are different from each other.

As the material of the second ceramic 13, silicon oxide, aluminum oxide, zinc oxide, oxides of alkaline earth elements, oxides of rare earth elements, and composite oxides thereof are suitable materials. In this case, the second ceramic 13 has many open pores 16. The open pores 16 extend in such a manner that the pores reach from an outer surface 15a of the porous ceramic composite 15 to the inner second ceramic particles 11. In this case, the open porosity may be 10% or higher in a non-limiting embodiment.

As the open porosity of the porous ceramic composite 15, a value measured for the porous ceramic composite 15 including the second ceramic particles 11 is used. This is because the second ceramic particles 11 are dense bodies and the porosity of the second ceramic 13 directly corresponds to the porosity of the porous ceramic composite 15.

The second ceramic particles 11 are any one of $AXO_{3\pm\delta}$ (where $0\leq\delta\leq1$, A: at least one of rare earth elements, alkaline earth elements, and alkali metal elements, X: at least one of transition metal elements and metalloid elements, and O: oxygen), cerium oxide, and zirconium oxide. In this case, the average particle diameter of the second ceramic particles 11 (in FIG. 1, the average particle diameter is represented by sign D) may be 5 nm to 200 nm a non-limiting embodiment.

As the suitable elements, lanthanide elements in the sixth period of the periodic table as the rare earth element, Ti, V, Cr, Mn, Zr, Nb, and Ta as the transition metal elements, and B, Si, Ge, As, Se, Sb, Te, Po, and At as the metalloid elements can be exemplified.

In the member for hydrogen production B1, the hydrogen generating part 10B is formed of the above porous ceramic composite 15. Therefore, even when the hydrogen generating part 10B becomes in a high temperature state, the hydrogen generating part 10B itself hardly deteriorates by oxidation. Consequently, the hydrogen generating part 10B having high durability can be formed.

When the second ceramic particles 11 having the above component are placed in a high temperature environment, a defect reaction expressed by Formula (1) occurs.

　　　(1)

$V_{\ddot{o}}$: Oxygen hole
2e': Electron

In this case, the second ceramic particles 11 constituting the porous ceramic composite 15 are fine and thus the electrons generated in the second ceramic particles 11 by the above defect reaction tend to stay on the surface of the second ceramic particles 11. In this case, the surface plasmon effect also occurs and thus the porous ceramic composite 15 itself can be changed into a high temperature state. This allows the second ceramic particles 11 themselves to have a function of absorbing light.

When the second ceramic particles 11 causing such a reaction exist in the second ceramic 13 being a porous product, the second ceramic particles 11 cause a reaction that releases oxygen (hereinafter referred to as an "oxygen release reaction" in some cases) as represented by Formula (2) in a high temperature state. On the other hand, at a temperature lower than the temperature at which the oxygen release reaction occurs, the second ceramic particles 11 cause a reaction that generates hydrogen (hereinafter referred to as a hydrogen production reaction) as represented by Formula (3).

　　　(2)

MO: Metal oxide
OX: Oxidation state
Red: Reduction state

　　　(3)

This is because the surface plasmon effect appears on the second ceramic particles 11 due to the above defect reaction and, in addition, the above oxidation-reduction reactions occur in the second ceramic 13 constituting the porous ceramic composite 15.

In this case, as the second ceramic particles 11, development of the surface plasmon effect can be more expected as the average particle diameter becomes smaller. So far, however, the second ceramic particles 11 having an average particle diameter of smaller than 5 nm are difficult to prepare. On the other hand, when the second ceramic particles 11 have an average particle diameter of larger than 200 nm, the surface plasmon effect is difficult to develop. Therefore, the porous ceramic composite 15 itself cannot be brought into the high temperature state. As a result, hydrogen is difficult to generate.

From the viewpoint of enhancing the surface plasmon effect of the second ceramic particles 11, the proportion of the second ceramic particles 11 included in the porous ceramic composite 15 may also be 20% to 80% in a volume ratio of a non-limiting embodiment. The second ceramic particles 11 may exist dispersedly in an isolated state as a single particle in the second ceramic 13 in a ratio in the particle number of 90% or higher in a non-limiting embodiment. Namely, in the First Embodiment, the second ceramic particles 11 may individually exist in the material constituting the second ceramic 13 being a parent material.

The proportion of the second ceramic particles 11 existing inside the porous ceramic composite 15 and whether the second ceramic particles 11 exist in the isolated state as a single particle in second ceramic 13 are determined by the method similar to the method for determining these properties of the light absorbing member A.

Figure 3:
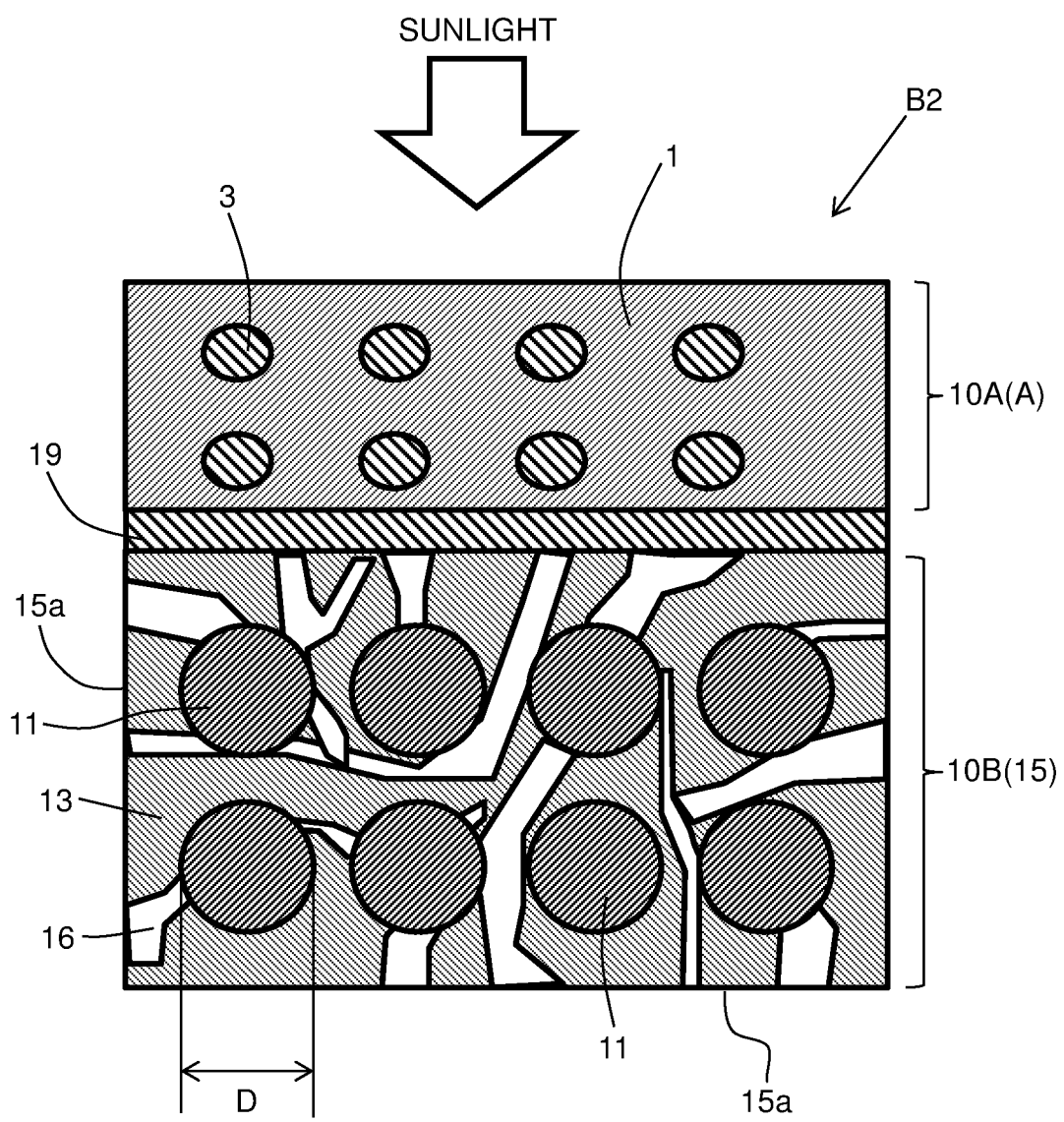
FIG. 3 is a sectional view schematically illustrating a Second Embodiment of the member for hydrogen production in the present disclosure.

FIG. 3 is a sectional view schematically illustrating the Second Embodiment of the member for hydrogen production in the present disclosure. The member for hydrogen production B2 illustrated in FIG. 3 is a modification of the member for hydrogen production B1 illustrated in FIG. 2. The member for hydrogen production B2 is a member formed by interposing a metal film 19 between the light absorbing member A and the porous ceramic composite 15.

In the member for hydrogen production B2, the metal film 19 is preferably interposed between the light absorbing member A and the porous ceramic composite 15. As illustrated in FIG. 3, when the metal film 19 is located between the light absorbing member A and the porous ceramic composite 15, the light incident to the light absorbing member A is reflected at the surface of the metal film 19 and thus the light incident to the light absorbing member A is difficult to permeate to the porous ceramic composite 15 side. This allows the light to concentrate inside the light absorbing member A and thus the amount of heat generated by the light absorbing member A can be increased. As the material of the metal film 19, any metal having high light reflectivity may be used. For example, tungsten, molybdenum, nickel, copper, silver, gold, platinum, palladium, and the like are suitable.

Figure 4A:
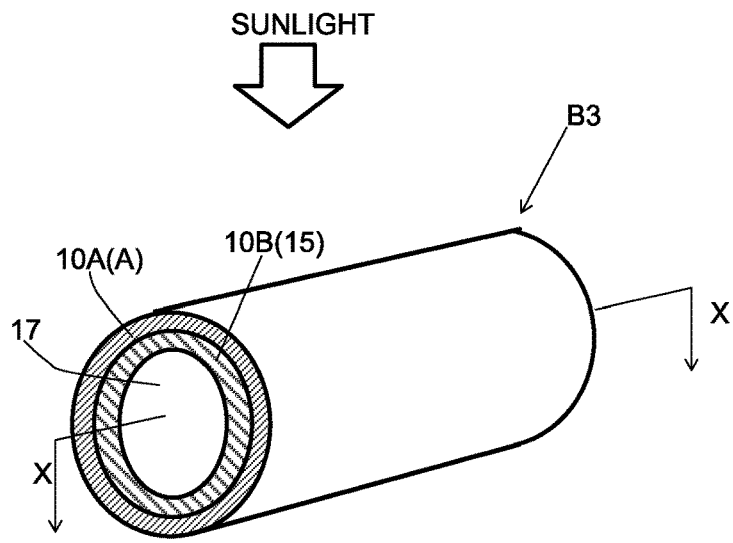
FIG. 4A is a perspective view schematically illustrating a Third Embodiment of the member for hydrogen production in the present disclosure.
Figure 4B:
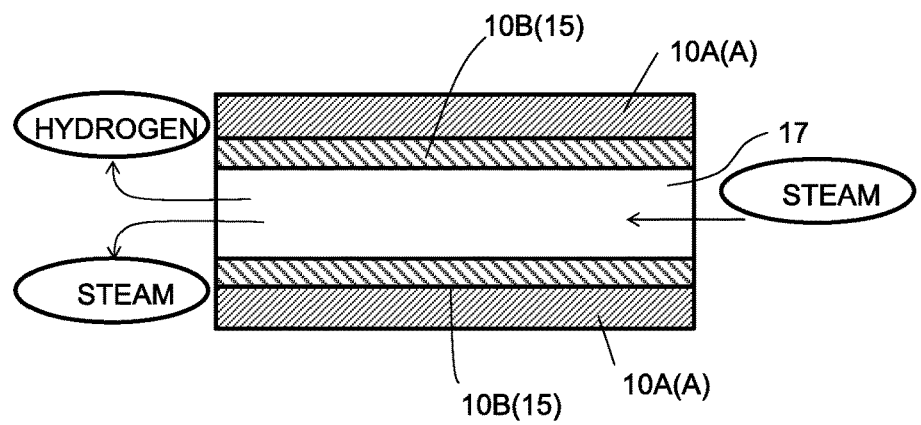
FIG. 4B is a sectional view of FIG. 4A taken along the line X-X.

FIG. 4A is a perspective view schematically illustrating the Third Embodiment of the member for hydrogen production in the present disclosure and FIG. 4B is a sectional view of FIG. 4A taken along the line X-X. In the member for hydrogen production B3 of the Third Embodiment illustrated in FIGS. 4A and 4B, both light absorbing member A constituting the light absorbing part 10A and the porous ceramic composite 15 constituting the hydrogen generating part 10B are tubular bodies. In this case, the light absorbing member A is located outside the porous ceramic composite 15 in such a manner that the light absorbing member A surrounds the circumference of the porous ceramic composite 15 having a cavity 17 inside.

When the light absorbing member A receives sunlight in the member for hydrogen production B3 of the Third Embodiment, the light absorbing member A and the porous ceramic composite 15 are heated to become a high temperature state. In this state, hydrogen is generated in the porous ceramic composite 15 when steam is introduced into the cavity 17 provided inside the porous ceramic composite 15. As illustrated in FIG. 4B, for example, the generated hydrogen is recovered from an edge part opposite to an edge part where the steam is introduced.

Figure 5:
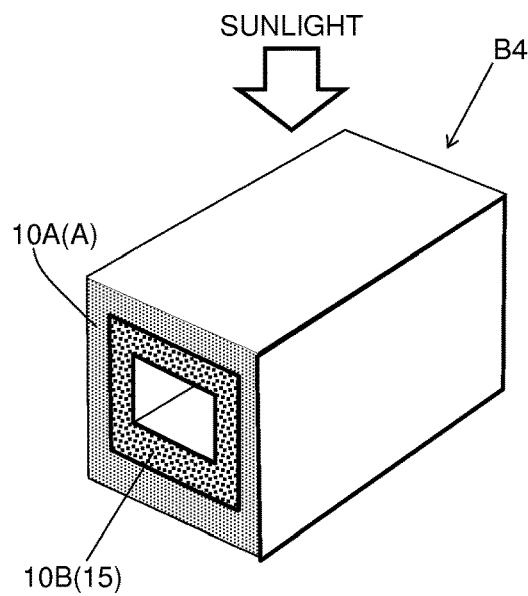
FIG. 5 is a perspective view schematically illustrating a Fourth Embodiment of the member for hydrogen production in the present disclosure.

FIG. 5 is a perspective view schematically illustrating the Fourth Embodiment of the member for hydrogen production in the present disclosure. The member for hydrogen production can be applied not only to the structure of the member for hydrogen production B3 but also to the structure in which both edge faces of the light absorbing part 10A and hydrogen generating part 10B form rectangular shapes as the member for hydrogen production B4 of the Fourth Embodiment illustrated in FIG. 5 in the same manner. In this case, the edge faces of the light absorbing part 10A and hydrogen generating part 10B may be polygonal shapes.

Figure 6A:
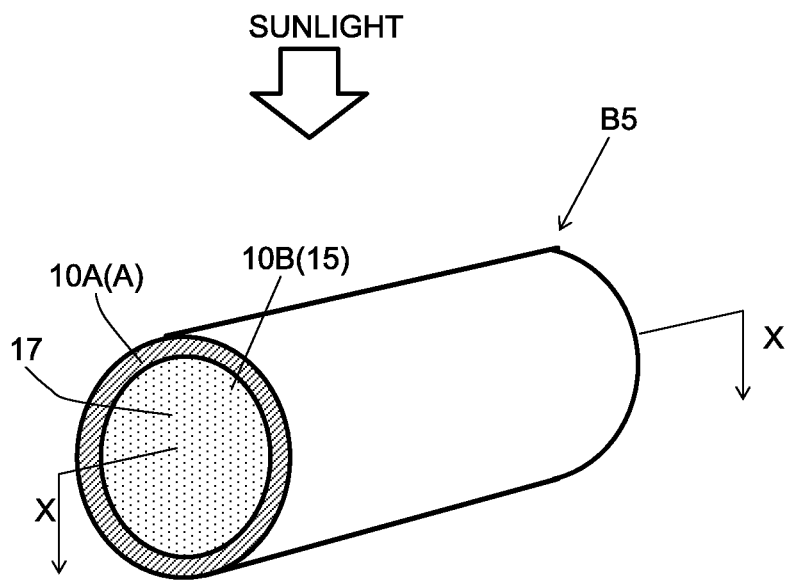
FIG. 6A is a perspective view schematically illustrating a Fifth Embodiment of the member for hydrogen production in the present disclosure.
Figure 6B:
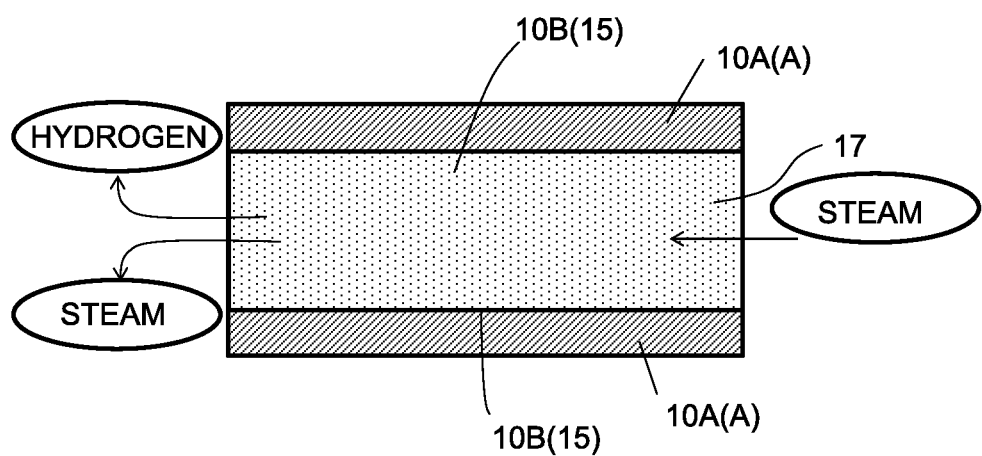
FIG. 6B is the sectional view of FIG. 6A taken along the line X-X.
Figure 7A:
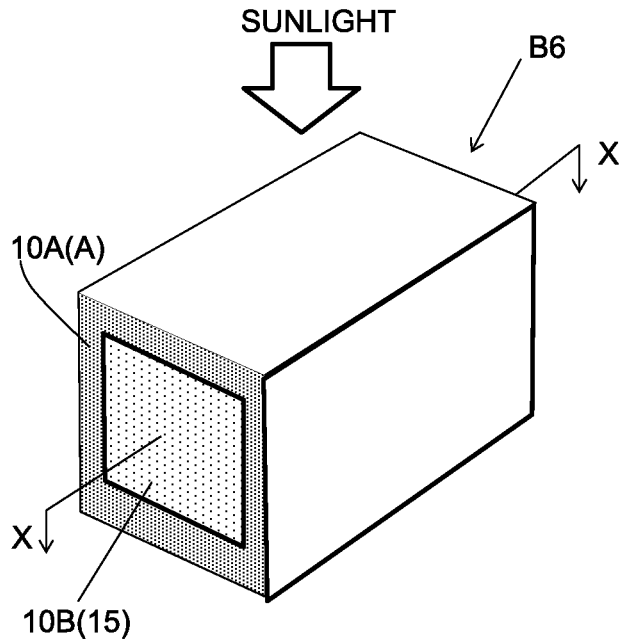
FIG. 7A is a perspective view schematically illustrating a Sixth Embodiment of the member for hydrogen production in the present disclosure.

FIG. 6A is a perspective view schematically illustrating the Fifth Embodiment of the member for hydrogen production in the present disclosure and FIG. 6B is the sectional view of FIG. 6A taken along the line X-X. FIG. 7A is a perspective view schematically illustrating the Sixth Embodiment of the member for hydrogen production in the present disclosure and FIG. 7B is the sectional view of FIG. 7A taken along the line X-X.

Figure 7B:
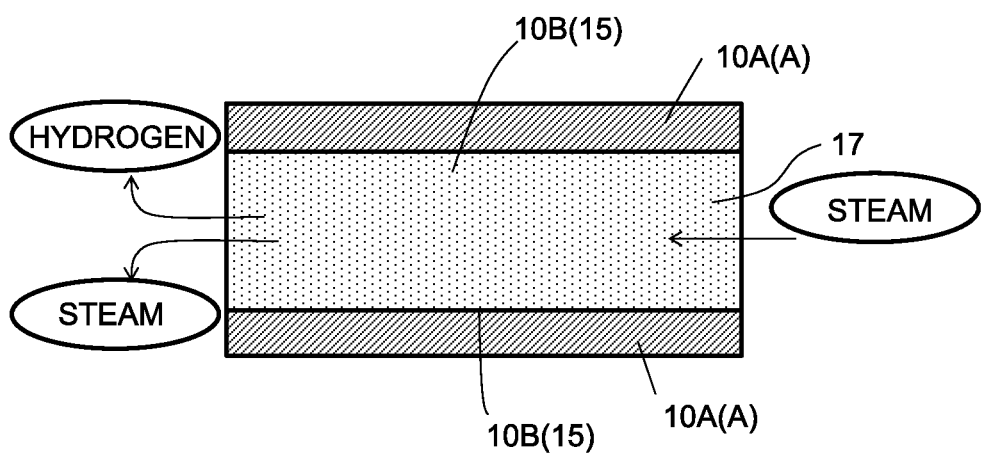
FIG. 7B is the sectional view of FIG. 7A taken along the line X-X.

As the member for hydrogen production B5 of the Fifth Embodiment illustrated in FIGS. 6A and 6B and the member for hydrogen production B6 of the Sixth Embodiment illustrated in FIGS. 7A and 7B can also be applied to the case where the cavity 17 is not provided in the porous ceramic composite 15 constituting the hydrogen generating part 10B to form a structure of a solid body in the same manner. In the cases each of the members for hydrogen production B5 and B6 illustrated in FIGS. 6A and 6B, and FIGS. 7A and 7B, the steam passes through its inside having porosity.

Figure 8A:
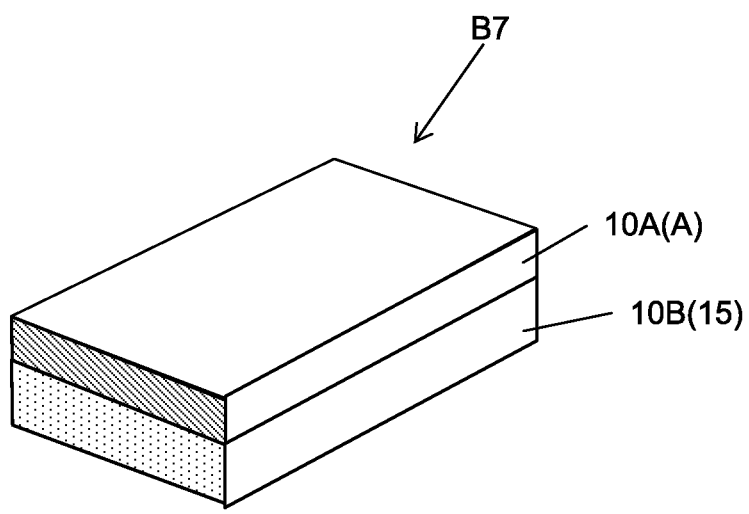
FIG. 8A is a perspective view schematically illustrating a Seventh Embodiment of the member for hydrogen production in the present disclosure.
Figure 8B:
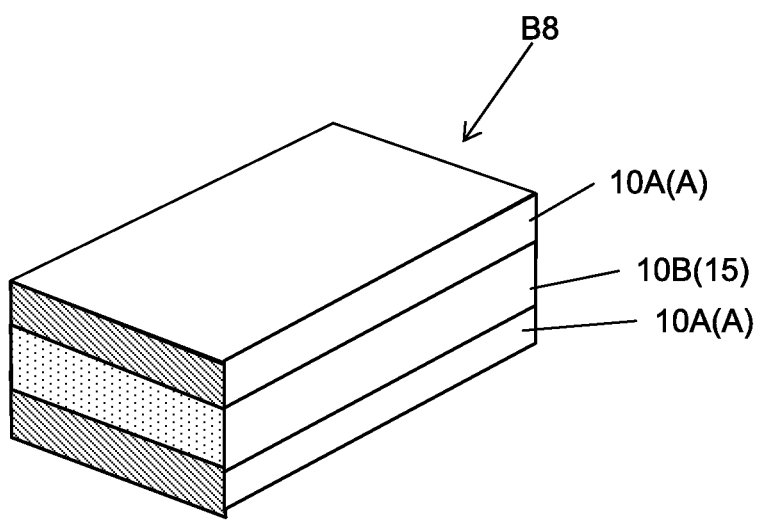
FIG. 8B is a perspective view schematically illustrating an Eighth Embodiment of a member for hydrogen production in the present disclosure.

As the member for hydrogen production of the Seventh and Eighth Embodiments, the members for hydrogen production B7 and B8 may have a laminated structure as illustrated in FIGS. 8A and 8B. Both of the laminated members for hydrogen production B7 and B8 have the flat plate type light absorbing member(s) A and the flat plate type porous ceramic composite 15. The members for hydrogen production B7 and B8 have structures in which the light absorbing member(s) A and the porous ceramic composite 15 are laminated. In these cases, as illustrated in FIG. 8B, the member for hydrogen production B8 may have a structure in which the porous ceramic composite 15 is sandwiched between the light absorbing members A from the upper side and the lower side. In the case where the porous ceramic composite 15 is sandwiched between the light absorbing members A from the upper side and the lower side, thermal efficiency of the porous ceramic composite 15 and recovery efficiency of the hydrogen can be improved because the member for hydrogen production B8 can receive sunlight from both sides.

Figure 9A:
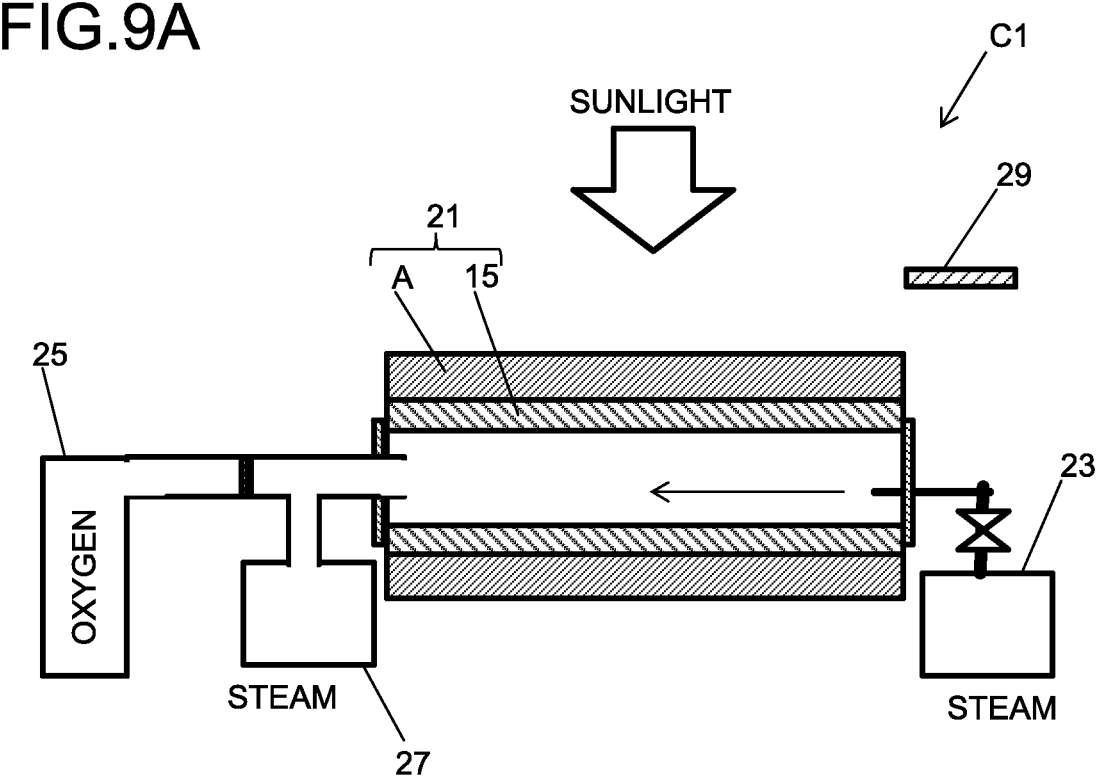
FIGS. 9A and 9B are sectional views schematically illustrating states when the hydrogen production apparatus of the First Embodiment in the present disclosure is operated.
Figure 9B:
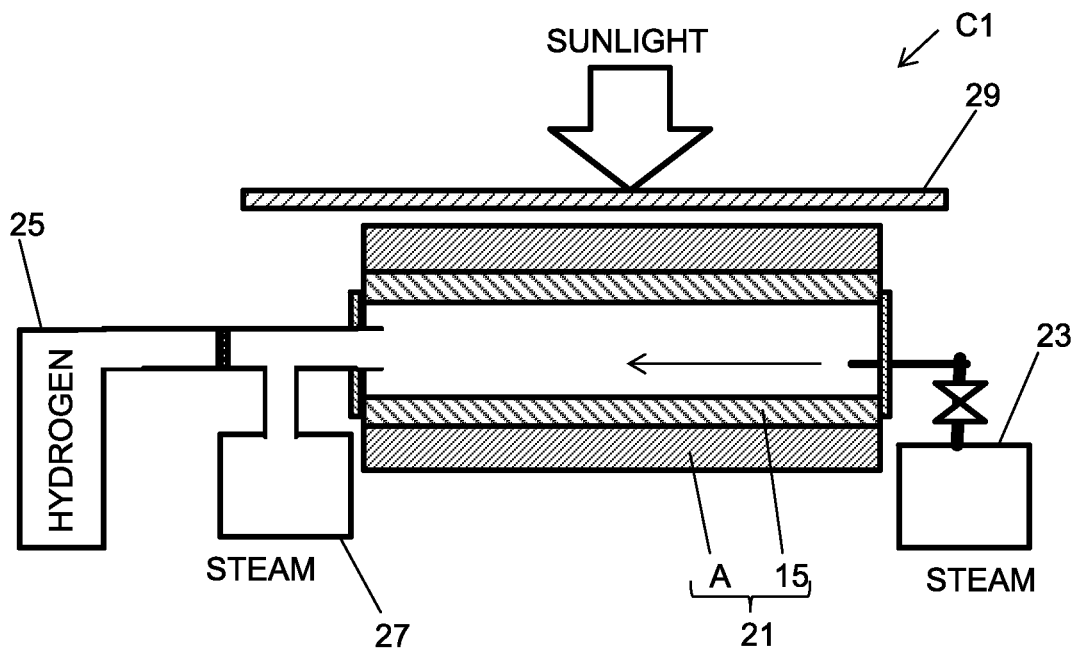

FIGS. 9A and 9B are sectional views schematically illustrating a state where the hydrogen production apparatus of the First Embodiment in the present disclosure is operated. FIG. 9A illustrates a state where oxygen is generated from the member for hydrogen production and FIG. 9B illustrates a state where hydrogen is generated from the member for hydrogen production.

The hydrogen production apparatus C1 of the First Embodiment includes a reaction module 21 configured to cause oxidation-reduction reactions by receiving solar energy (white arrows illustrated in FIGS. 9A and 9B), a steam supply module 23 configured to supply steam to the reaction module 21, and a recovery module 25 configured to recover hydrogen gas or oxygen gas generated from the reaction module 21. A steam recovery module 27 configured to recover the unreacted steam is located between the recovery module 25 and the reaction module 21. In the hydrogen production apparatus C1, a shielding plate 29 configured to allow the reaction module 21 to receive or shield sunlight is located. The shielding plate 29 may be an opaque plate and any material such as plastic, metal, and wood can be used as the material.

As illustrated in FIG. 9A, when the shielding plate 29 is transferred from the upper surface of the reaction module 21, the light absorbing member A absorbs sunlight to become a high temperature state. The porous ceramic composite 15 being the member for hydrogen production is heated by the light absorbing member A. As a result, the porous ceramic composite 15 being the member for hydrogen production located in the reaction module 21 becomes in a high temperature state and thus the porous ceramic composite 15 causes the reduction reaction represented by Formula (2) to generate oxygen.

Subsequently, as illustrated in FIG. 9B, when the reaction module 21 is covered with the shielding plate 29, the light absorbing member A and the porous ceramic composite 15 are shielded from sunlight. At this time, when steam is supplied to the reaction module 21 to bring into contact with the porous ceramic composite 15, the porous ceramic composite 15 is cooled from the state illustrated in FIG. 9A where the reduction reaction has occurred. This allows the reduction reaction to be stopped. Subsequently, the oxidation reaction represented by Formula (3) occurs to generate hydrogen gas inside the porous ceramic composite 15. Consequently, according to the hydrogen production apparatus C1, the heat from the sunlight can be efficiently absorbed to effectively generate hydrogen. Although the constitution in which the member for hydrogen production B3 is located in the reaction module 21 is illustrated in FIGS. 9A and 9B, the members for hydrogen production B4, B5, and B6 can also be applied in the same manner.

Figure 10A:
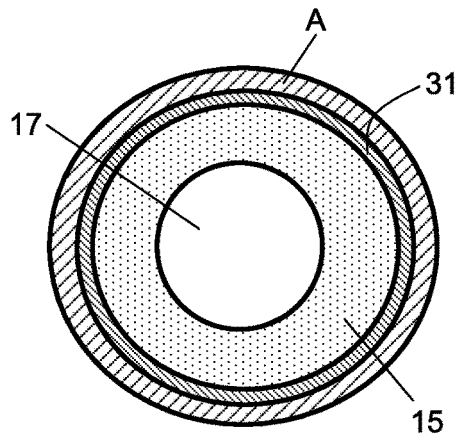
FIGS. 10A to 10D are sectional views illustrating the structures of the members for hydrogen production in which a shielding layer is located between the light absorbing member and a porous ceramic composite.
Figure 10B:
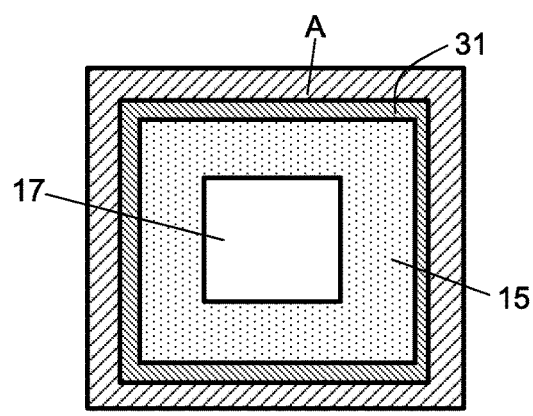
Figure 10C:
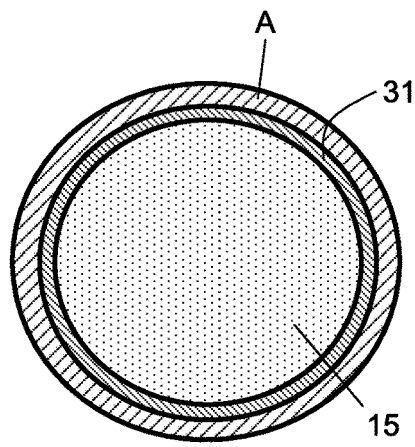
Figure 10D:
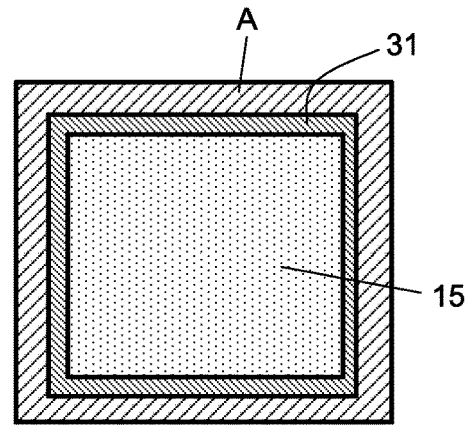

FIGS. 10A to 10D are sectional views illustrating the structures of the members for hydrogen production in which a shielding layer is located between the light absorbing member and a porous ceramic composite. FIG. 10A illustrates the case of FIG. 4 where the section of the member for hydrogen production is circular and the member forms a tubular form. FIG. 10B illustrates the case of FIG. 5 where the section of the member for hydrogen production is rectangular and the member forms a tubular form. FIG. 10C illustrates the case of FIGS. 6A and 6B where the section of the member for hydrogen production is circular and the member forms a columnar form. FIG. 10D illustrates the case of FIGS. 7A and 7B where the section of the member for hydrogen production is rectangular and the member forms a columnar form.

In the hydrogen production apparatus C1, when the reactions represented by Formula (1), Formula (2), and Formula (3) are generated, oxygen ($O_2$), steam ($H_2O$) and hydrogen ($H_2$) are diffused in the reaction module 21. Parts of oxygen ($O_2$), steam ($H_2O$), and hydrogen ($H_2$) do not stay in the porous ceramic composite 15 in the reaction module 21 and are contact with the light absorbing member A. This may cause deterioration of the light absorbing member A. For such a problem, performance deterioration of the light absorbing member A caused by oxidation and/or reduction can be reduced by locating a shielding layer 31 between the light absorbing member A and the porous ceramic composite 15.

When the shielding layer 31 is located between the light absorbing member A and the porous ceramic composite 15, the region where oxygen ($O_2$), steam ($H_2O$), and hydrogen ($H_2$) transfer is limited in the porous ceramic composite 15 located inside the shielding layer 31 and thus hydrogen can be effectively recovered.

The ratio of the amount of generated hydrogen can be increased relative to the amount of supplied steam by staying the supplied steam in the porous ceramic composite 15 located inside the shielding layer 31.

The material of the shielding layer 31 is suitably one material selected from the group consisting of a metal material, a ceramic material, and a glass material. Among them, the metal material is particularly preferable. When the metal material is used for the shielding layer 31, a dense film can be formed even when the thickness of the metal film is thin. Therefore, the film can reduce permeation of gas such as hydrogen. In the case of the metal material, the film exhibits metallic luster and thus the shielding effect of light is enhanced similar to the cases of FIG. 3 and FIGS. 4A and 4B. This allows the amount of heat generated by the light absorbing member A to increase.

Figure 11:
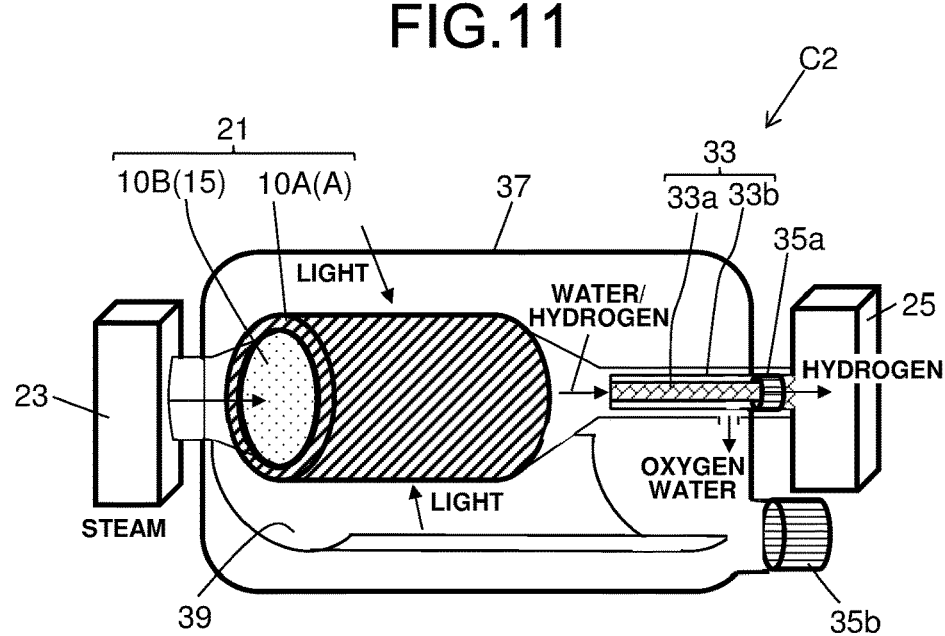
FIG. 11 is a schematic view illustrating a hydrogen production apparatus of the Second Embodiment and illustrating a constitution in which a hydrogen separation module is located between a reaction module and a recovery module.

FIG. 11 is a schematic view illustrating the hydrogen production apparatus of the Second Embodiment and illustrating a constitution in which a hydrogen separation module is located between the reaction module and the recovery module. As the hydrogen production apparatus C2 as illustrated in FIG. 11, when the hydrogen production apparatus C2 has a constitution in which a hydrogen separation module 33 is located between the reaction module 21 and the recovery module 25, the hydrogen transferred from the reaction module 21 to the recovery module 25 can be recovered in high purity.

Examples of the hydrogen separation module 33 may include a constitution in which a porous ceramic tube 33a is located inside a glass tube 33b, etc. Then, a principle that hydrogen can be recovered in high concentration by using the hydrogen separation module 33 will be described with reference to FIG. 11.

First of all, mixed gas containing hydrogen and steam transferred from the reaction module 21 initially enters in the glass tube 33b located outside the porous ceramic tube 33a. When the pressure inside the porous ceramic tube 33a is reduced by using a pump 35a, a pressure difference is generated between the inside of the porous ceramic tube 33a and the outside of the ceramic tube 33a. The pressure of the inside of the ceramic tube 33a is lower than the pressure of the portion of the glass tube 33b located outside the ceramic tube 33a.

The mixed gas transfers from the outside of the ceramic tube 33a located inside the glass tube 33b to the inside of the ceramic tube 33a. The ceramic tube 33a is made of a material that permeates hydrogen but does not permeate steam and thus hydrogen alone transfers to the inside of the ceramic tube 33a. Accordingly, high purity hydrogen can be recovered from the mixed gas of hydrogen and steam transferred from the reaction module 21.

As illustrated in FIG. 11, the reaction module 21 and the hydrogen separation module 33 are preferably contained in a container 37 in a state of reduced pressure with a pump 35b. This can prevent the heat generated by the light absorbing member A from transferring to the outside other than the reaction module 21 and the hydrogen separation module 33. Namely, defluxion of the heat from the hydrogen generating part 10B of the reaction module 21 to the outside can be prevented.

When the pressure of the reaction module 21 is reduced, oxygen defect tends to be formed in the side of the porous ceramic composite 15 constituting the hydrogen generating part 10B of the reaction module 21. This allows the reduction reaction of the porous ceramic composite 15 to be promoted and the amounts of oxygen and hydrogen to be generated from the porous ceramic composite 15 can be increased. In this case, a transparent container is preferably used as the container 37. The reaction module 21 can be irradiated with sunlight from all directions. A light collecting plate 39 is preferably located in the container 37. This allows the backside of the reaction module 21 opposite to the incident side of sunlight to be also irradiated with sunlight. Consequently, areas having low oxidation-reduction reaction efficiency can be reduced in the reaction module 21. As a result, generation efficiency of hydrogen can be increased.

EXAMPLES

Hereinafter, light absorbing members and members for hydrogen production were prepared so as to have the constitution listed in Table 1 and whether the members for hydrogen production produced hydrogen was evaluated.

In this case, a perovskite material containing $La_{0.8}Sr_{0.2}MnO_3$ as the main component and substituting the Mn site with 0.5 mol of Fe was used for the first ceramic particles of the light absorbing member and the second ceramic particles of the member for hydrogen production. This perovskite material was synthesized by providing each metal alkoxide, preparing these metal alkoxides so as to be the above composition, and thereafter carrying out spray thermal decomposition. Subsequently, the synthesized powder was poured into water and classification operation was carried out by checking a sedimentation state at every predetermined time to give the powder of the perovskite material (composite oxide particles and ceramic particles) having an average particle diameter listed in Table 1.

Subsequently, a glass powder (borosilicate glass) was mixed with the obtained perovskite material powder to prepare a composite powder. In this case, the composition of the mixed powder at the time of preparing the porous ceramic composite was prepared in such a manner that the perovskite material powder was 70% by volume and the glass powder was 30% by volume.

The composition of the light absorbing member was prepared in such a manner that the proportion of perovskite material powder was 50% by volume and the proportion of the glass powder was 50% by volume.

Subsequently, 10% by mass of PVA (polyvinyl alcohol) as an organic binder was added to the obtained composite powder to prepare a molded article. After the molded article was degreased, sintered products to be the light absorbing member and the porous ceramic composite were prepared by heating the molded article in the air using an infrared image furnace under conditions of a maximum temperature of 1400° C. and a retention time of about 1 second. The prepared porous ceramic composite had an open porosity of 10% and the light absorbing members had open porosities of values listed in Table 1. The state where 90% of the composite oxide particles included in the prepared light absorbing member and 92% of the composite oxide particles included in the prepared porous ceramic composite isolatedly exist was confirmed by observing the section using a scanning electron microscope.

The prepared sintered product was processed by polishing to prepare the porous ceramic composite having a length of 10 mm, a thickness of 1 mm, and an inner diameter of 3 mm and the light absorbing member having a length of 10 mm, a thickness of 1 mm, and an inner diameter of 5.2 mm. The tubular porous ceramic composite was inserted into the inside of the tubular light absorbing member to prepare the member for hydrogen production illustrated in FIGS. 4A and 4B. At this time, a metal film (Au) was formed on the outer surface of the porous ceramic composite. The inner surface of the light absorbing member and the outer surface of the porous ceramic composite were bonded. By using thus prepared member for hydrogen production, the hydrogen production apparatus as illustrated in FIGS. 9A and 9B was assembled to prepare an apparatus for evaluation.

The sections of the prepared light absorbing member and porous ceramic composite were analyzed using an electron microscope and an attached analyzer (EPMA). In this case, the first ceramic particles constituting the light absorbing member and the second ceramic particles constituting the porous ceramic composite had little particle growth and the average particle diameters were almost equal to the values listed in Table 1. The luminance of the prepared light absorbing member was 6 in the luminance indication classified by the Munsell color system.

As Comparative Example, a sample having two layers of the porous ceramic composite was prepared using the porous ceramic composite having an open porosity of 10% instead of the light absorbing member having an open porosity of 1% (Sample No. 1).

The amount of generated hydrogen gas was measured by installing a gas chromatograph apparatus in the recovery module of the hydrogen production apparatus. In this case, the measurement was carried out in such a manner that the hydrogen production apparatus received sunlight in a state of 1 SUN. The generated amounts obtained through 10 cycles are listed in Table 1.

TABLE 1

| Sample No. | Average particle diameter of first ceramic particles and second ceramic particles nm | Open porosity of light absorbing member % | Amount of generated hydrogen ml/g |
| --- | --- | --- | --- |
| 1 | 55 | 10.3 | 0 |
| 2 | 6 | 1.3 | 0.4 |
| 3 | 55 | 1.4 | 1.1 |
| 4 | 180 | 1.6 | 0.6 |
| 5 | 280 | 1.7 | 0.01 |

As is clear from the results of Table 1, amounts of generated hydrogen of 0.4 ml/g to 1.1 ml/g were confirmed in the cases of Sample Nos. 2 to 4, in which the perovskite materials having average particle diameters of 6 nm to 180 nm were applied as the first ceramic particles of the light absorbing member and the second ceramic particles of the porous ceramic composite, whereas the amount of generated hydrogen was 0.01 ml/g in the case of the sample (Sample No. 5), in which the perovskite material having an average particle diameter of 280 nm was applied. In the case of the sample (Sample No. 1), which is prepared by applying the porous ceramic composite having an open porosity of 10.3% as the light absorbing member, generation of hydrogen could not be observed.

REFERENCE SIGNS LIST

Additional advantages and modifications will readily occur to those skilled in the art. Therefore, the invention in its broader aspects is not limited to the specific details and representative embodiments shown and described herein. Reference to numerical embodiments, e.g., the First Embodiment to the Eighth Embodiment, used to describe various embodiments as described herein, one skilled in the art would recognize that various features in the disclosure are not necessarily mutually exclusive, as some aspects of the disclosure may be combined with one or more other embodiments and aspects of the disclosure. Accordingly, various modifications may be made without departing from the spirit or scope of the general inventive concept as defined by the appended claims and their equivalents.

What is claimed is:

1. A light absorbing member comprising:
a ceramic composite consisting essentially of:
a plurality of first ceramic particles comprising a first material, the plurality of first ceramic particles having a positive resistance temperature coefficient,
a first ceramic comprising a second material, the first ceramic having an open porosity in a range greater than zero and less than or equal to 5%, wherein
the plurality of first ceramic particles are dispersed within the first ceramic,
the first material of the plurality of first ceramic particles is a perovskite type composite oxide represented as $ABO_3$, and
the second material comprises silicon oxide.

2. The light absorbing member according to claim 1, wherein the first material of the plurality of first ceramic particles comprises La as an element of an A site of the $ABO_3$ and comprises Mn as an element of a B site of the $ABO_3$.

3. The light absorbing member according to claim 1, wherein a luminance of color of the first ceramic is 5 or higher in luminance indication classified by the Munsell color system.

4. A member for hydrogen production comprising:
a hydrogen generating part comprising a porous ceramic composite comprising second ceramic particles in a porous second ceramic; and
a light absorbing part,
wherein the light absorbing part comprises a first light absorbing member according to the light absorbing member according to claim 1 and a second light absorbing member according to the light absorbing member according to claim 1.

5. The member for hydrogen production according to claim 4,
wherein the first ceramic particles and the second ceramic particles have an average particle diameter of 5 nm to 200 nm.

6. The member for hydrogen production according to claim 4,
wherein the second ceramic particles are selected from the group consisting of $AXO_{3\pm\delta}$ (where $0\leq\delta\leq1$, A: at least one of rare earth elements, alkaline earth elements, and alkali metal elements, X: at least one of transition metal elements and metalloid elements, and O: oxygen), cerium oxide, and zirconium oxide.

7. The member for hydrogen production according to claim 4,
wherein the proportion of the second ceramic particles in the porous ceramic composite is 20% by volume to 80% by volume.

8. The member for hydrogen production according to claim 4,
wherein the second ceramic particles exist in an isolated state in a ratio in the particle number of 90% or higher.

9. The member for hydrogen production according to claim 4,
wherein both of the light absorbing member and the porous ceramic composite form tubular forms and the porous ceramic composite is located inside the light absorbing member.

10. The member for hydrogen production according to claim 9,
wherein a shielding layer is located between the light absorbing member and the porous ceramic composite.

11. The member for hydrogen production according to claim 10,
wherein the shielding layer is selected from the group consisting of a metal material, a ceramic material, and a glass material.

12. The member for hydrogen production according to claim 4,
wherein the porous ceramic composite is a cylindrical column body or a rectangular column body, and the light absorbing member is located in such a manner that the light absorbing member surrounds the side surface of the porous ceramic composite.

13. The member for hydrogen production according to claim 12,
wherein a shielding layer is located between the light absorbing member and the porous ceramic composite.

14. The member for hydrogen production according to claim 13,
wherein the shielding layer is selected from the group consisting of a metal material, a ceramic material, and a glass material.

15. The member for hydrogen production according to claim 4,
wherein the first light absorbing member, the second light absorbing member, and the porous ceramic composite are flat plate type, and the member for hydrogen production has a laminated structure in which the porous ceramic composite is sandwiched between the first light absorbing member on an upper side of the porous ceramic composite and the second light absorbing member on a lower side of the porous ceramic composite.

16. A hydrogen production apparatus comprising:
a reaction module configured to cause oxidation-reduction reactions by receiving solar energy,
a steam supply module configured to supply steam to the reaction module, and
a recovery module configured to recover hydrogen gas generated from the reaction module,
wherein the member for hydrogen production according to claim 4 is located in the reaction module.

17. The hydrogen production apparatus according to claim 16,
wherein a hydrogen separation module is located between the reaction module and the recovery module.

18. The hydrogen production apparatus according to claim 16,
wherein the reaction module is contained in a container configured to decrease its pressure.

* * * * *